(12) United States Patent
Kwon et al.

(10) Patent No.: US 10,291,128 B1
(45) Date of Patent: May 14, 2019

(54) MINIMIZING BODY DIODE CONDUCTION IN SYNCHRONOUS CONVERTERS

(71) Applicant: Linear Technology Holding LLC, Norwood, MA (US)

(72) Inventors: Dongwon Kwon, San Jose, CA (US); Joshua William Caldwell, Los Gatos, CA (US)

(73) Assignee: Linear Technology Holding LLC, Norwood, MA (US)

( * ) Notice: Subject to any disclaimer, the term of this patent is extended or adjusted under 35 U.S.C. 154(b) by 0 days.

(21) Appl. No.: 15/847,853

(22) Filed: Dec. 19, 2017

(51) Int. Cl.
  *H02M 1/38* (2007.01)
  *H02M 3/158* (2006.01)
  *H02P 7/29* (2016.01)
  *H02M 1/00* (2006.01)

(52) U.S. Cl.
  CPC ............ *H02M 3/1588* (2013.01); *H02P 7/29* (2013.01); *H02M 2001/0003* (2013.01); *H02M 2001/0051* (2013.01); *H02M 2001/385* (2013.01)

(58) Field of Classification Search
  CPC ........... H02M 2001/0051; H02M 1/38; H02M 2001/385
  See application file for complete search history.

(56) References Cited

U.S. PATENT DOCUMENTS

| | | | |
|---|---|---|---|
| 6,107,844 A * | 8/2000 | Berg | H02M 7/5387 327/110 |
| 6,396,250 B1 | 5/2002 | Bridge | |
| 6,504,351 B2 | 1/2003 | Eagar et al. | |
| 6,515,463 B2 | 2/2003 | Ling | |
| 6,535,400 B2 | 3/2003 | Bridge | |
| 6,737,842 B2 | 5/2004 | Bai et al. | |

(Continued)

FOREIGN PATENT DOCUMENTS

| | | |
|---|---|---|
| AU | 6263799 A | 4/2000 |
| CA | 2344264 A1 | 4/2000 |

(Continued)

OTHER PUBLICATIONS

Mappus, "Predictive Gate Drive Boosts Synchronous DC/DC Power Converter Efficiency," Texas Instruments, Power Supply Control Systems, Apr. 2003, pp. 1-25, Texas instruments, Dallas.

(Continued)

*Primary Examiner* — Harry R Behm
(74) *Attorney, Agent, or Firm* — Schwegman Lundberg & Woessner, P.A.

(57) ABSTRACT

A synchronous converter that includes a power source, an inductor, an output terminal, and a control circuit. The control circuit may include: an electronic energizing switch that, when activated, delivers energy from the power source to the inductor; an electronic de-energizing switch that, when activated, delivers energy from the inductor to the output terminal, the electronic de-energizing switch including a body diode; and an electronic pull-down switch that, when activated, turns off the electronic de-energizing switch, redirects current flowing though the body diode of the electronic de-energizing switch, and removes charge from the body diode of the electronic de-energizing switch. The electronic energizing switch and the electronic de-energizing switch may never both be activated at the same time.

20 Claims, 6 Drawing Sheets

(56) References Cited

U.S. PATENT DOCUMENTS

| | | | |
|---|---|---|---|
| 6,861,826 | B2 | 3/2005 | Lynch |
| 6,870,747 | B2 | 3/2005 | Bridge |
| 7,443,146 | B2 | 10/2008 | Wei et al. |
| 7,508,175 | B2 | 3/2009 | DeWitt et al. |
| 7,548,435 | B2 | 6/2009 | Mao |
| 7,746,042 | B2 | 6/2010 | Williams et al. |
| 7,786,711 | B2 | 8/2010 | Wei et al. |
| 8,803,494 | B2 | 8/2014 | D'Angelo et al. |
| 8,994,349 | B2 | 3/2015 | Martinelli |
| 9,350,236 | B2 | 5/2016 | D'angelo et al. |
| 9,537,383 | B1 | 1/2017 | Wibben |
| 9,577,525 | B2 | 2/2017 | Biondi et al. |
| 9,608,532 | B2 | 3/2017 | Wong et al. |
| 9,634,555 | B2 | 4/2017 | De Rooij et al. |
| 9,698,768 | B2 | 7/2017 | Leong et al. |
| 9,712,046 | B2 | 7/2017 | Sandner et al. |
| 2002/0141209 | A1 | 10/2002 | Bridge |
| 2002/0145891 | A1 | 10/2002 | Ling |
| 2003/0117119 | A1 | 6/2003 | Bridge |
| 2004/0070377 | A1 | 4/2004 | Bai et al. |
| 2004/0080969 | A1* | 4/2004 | Franck .......... H02M 1/38 363/132 |
| 2004/0189269 | A1 | 9/2004 | Lynch |
| 2007/0230228 | A1 | 10/2007 | Mao |
| 2007/0273349 | A1 | 11/2007 | Wei et al. |
| 2008/0084197 | A1 | 4/2008 | Williams et al. |
| 2008/0253152 | A1 | 10/2008 | D'angelo et al. |
| 2009/0046485 | A1 | 2/2009 | Wei et al. |
| 2012/0140526 | A1 | 6/2012 | Martinelli |
| 2013/0038260 | A1* | 2/2013 | Chang .......... H02P 6/085 318/400.35 |
| 2013/0063984 | A1 | 3/2013 | Sandner et al. |
| 2014/0203763 | A1* | 7/2014 | Zhao .......... H02J 7/0081 320/107 |
| 2014/0333272 | A1 | 11/2014 | D'angelo et al. |
| 2015/0049528 | A1 | 2/2015 | De Rooij et al. |
| 2015/0256074 | A1 | 9/2015 | Biondi et al. |
| 2015/0326103 | A1 | 11/2015 | Choi |
| 2017/0019015 | A1 | 1/2017 | Wibben |
| 2017/0019095 | A1 | 1/2017 | Leong et al. |
| 2017/0179809 | A1 | 6/2017 | Choi |

FOREIGN PATENT DOCUMENTS

| | | |
|---|---|---|
| CA | 2756180 A1 | 6/2012 |
| CA | 2756180 C | 10/2014 |
| CN | 1320298 A | 10/2001 |
| CN | 101047335 A | 10/2007 |
| CN | 101622774 A | 1/2010 |
| CN | 104579274 A | 4/2015 |
| CN | 204376860 U | 6/2015 |
| CN | 104901526 A | 9/2015 |
| CN | 102570893 B | 4/2016 |
| CN | 106357096 A | 1/2017 |
| DE | 102012108489 A1 | 3/2013 |
| DE | 102016112958 | 1/2017 |
| EP | 1119900 A1 | 8/2001 |
| EP | 2080260 A1 | 7/2009 |
| EP | 2461472 A2 | 6/2012 |
| JP | 2002527024 A | 8/2002 |
| JP | 2010506552 A | 2/2010 |
| JP | 2012120427 A | 6/2012 |
| JP | 5105337 B | 10/2012 |
| JP | 5939771 B | 5/2016 |
| KR | 20090085038 A | 8/2009 |
| KR | 1020097008696 A | 8/2009 |
| KR | 101108293 A | 1/2012 |
| KR | 20150128517 A | 11/2015 |
| TW | 200830681 A | 7/2008 |
| TW | I359554 B | 3/2012 |
| TW | 201406024 A | 2/2014 |
| TW | I489751 B | 6/2015 |
| WO | WO-2000019597 | 4/2000 |
| WO | WO-2008045201 | 4/2008 |
| WO | WO-2013188119 | 12/2013 |

OTHER PUBLICATIONS

Bridge, "The Implication of Synchronous Rectifiers to the Design of Isolated, Single-Ended Forward Converters," 2002, pp. 7-1-7-18, Texas Instruments, Dallas.

Hunter, "Variable-Frequency Pulse-Width-Modulation for Zero-Voltage Switching in a Boost DC-DC Regulator," Calhoun Institutional Archive of the Naval Postgraduate School, Mar. 1990, pp. 1-59, Dudley Knox Library, Naval Postgraduate School, Monterey, http://hdl.handle.net/10945/37543.

Strydom et al., "Dead-Time Optimization for Maximum Efficiency," IEPC—Efficient Power Conversion, 2013, pp. 1-6, Efficient Power Conversion Corporation.

Mappus, "Synchronous Rectification for Forward Converters," Fairchild Semiconductor Power Seminar, 2010-2011, pp. 1-19.

Chen et al., "Spike of Buck Converter Influenced by Reverse Recovery Current," Niko-Sem—Niko Semiconductor Co., Ltd., Mar. 11, 2010, FA Report No. F010310M, pp. 1-9.

* cited by examiner

MINIMIZING BODY DIODE CONDUCTION IN SYNCHRONOUS CONVERTERS

FIELD OF THE DISCLOSURE

This disclosure relates to synchronous converters, including synchronous boost converters, synchronous buck-boost converters, and synchronous H-bridge converters.

BACKGROUND

Synchronous converters, such as synchronous boost converters, synchronous buck-boost converters, and synchronous H-bridge converters, may use a controlled energizing switch to transfer a controlled amount of energy into an inductor and a controlled de-energizing switch to transfer a controlled amount of energy from the inductor into a load through an output terminal.

The two switches may never be turned on at the same time to avoid unregulated shoot-through current from the output of the converter to ground through the two switches. Consequently, there may be two transitional durations during each switching cycle during which both switches are off. These durations are called deadtime in switching converters.

Deadtime causes power losses and EMI problems in the switching converters. Minimizing this deadtime while avoiding shoot-through current has thus been a continuing problem for which an effective solution has not yet been provided.

SUMMARY OF THE DISCLOSURE

A synchronous converter may include a power source, an inductor, an output terminal, and a control circuit. The control circuit may include: an electronic energizing switch that, when activated, delivers energy from the power source to the inductor; an electronic de-energizing switch that, when activated, delivers energy from the inductor to the output terminal, the electronic de-energizing switch including a body diode; and an electronic pull-down switch that, when activated, turns off the electronic de-energizing switch, redirects current flowing though the body diode of the electronic de-energizing switch, and removes charge from the body diode of the electronic de-energizing switch. The electronic energizing switch and the electronic de-energizing switch may never both be activated at the same time.

The current and charge from the body diode may be removed by the electronic pull-down switch within no more than one nanosecond.

The control circuit may include a redirection/removal diode through which the current redirected from the body diode and the charge removed from the body diode flows.

The control circuit may include a driver that controls the electronic energizing switch and the electronic de-energizing switch. The redirection/removal diode may be a body diode in the driver.

The electronic energizing switch, the electronic de-energizing switch, and the electronic pull-down switches may each be an NMOS device or a GaN power switch.

The synchronous converter may be a synchronous boost converter, a synchronous buck-boost converter, or a synchronous H-bridge converter.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1A:
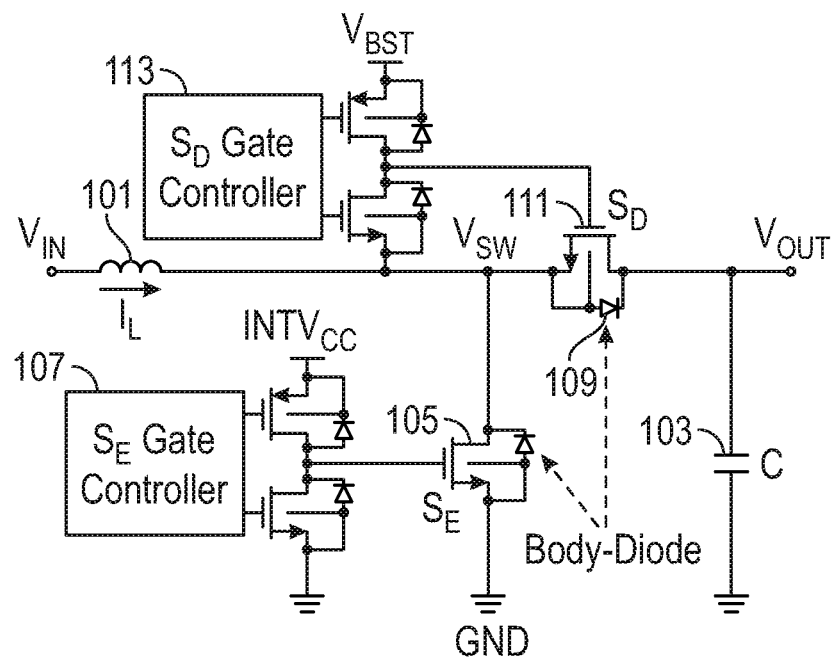
FIG. 1A illustrates an example of a synchronous boost converter power stage.

FIG. 1A illustrates an example of a synchronous boost converter power stage. The synchronous boost converter shown in FIG. 1A may generate a higher output voltage ($V_{OUT}$) than input voltage ($V_{IN}$) by energizing an inductor 101 and de-energizing energy stored in the inductor 101 to an output capacitor 103 coupled to the output terminal.

When an $S_E$ gate controller 107 turns on an energizing switch ($S_E$) 105, the current in the inductor 101 ($I_L$) may increase. Then, the $S_E$ gate controller 107 may turn off the $S_E$ 105 to let $I_L$ raise the switch node voltage ($V_{SW}$) until $I_L$ flows through a body diode 109 of a de-energizing switch ($S_D$) 111. At this point, an $S_D$ gate controller 113 may turn on the $S_D$ 111 to reduce the conduction loss by flowing $I_L$ through its enhanced channel. When the $S_D$ 111 is turned off, $I_L$ may first flow through the body diode 109 of the $S_D$ 111 again until the $S_E$ 105 is turned on to pull the current and bring $V_{SW}$ down to energize the inductor 101, restarting the switching cycle.

Figure 1B:
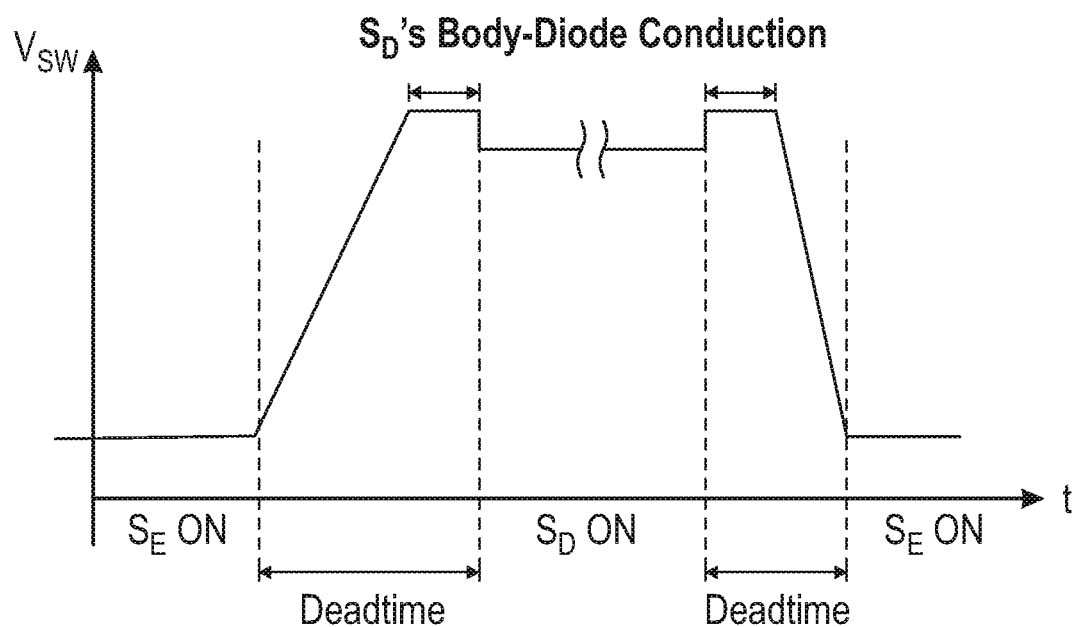
FIG. 1B illustrates an example of a switch node voltage waveform in the boost converter illustrated in FIG. 1A.

FIG. 1B illustrates an example of a switch node voltage waveform of the boost converter illustrated in FIG. 1A.

The two switches 105 and 111 may never be turned on at the same time to avoid unregulated shoot-through current from $V_{OUT}$ to ground through the two enhanced switches $S_E$ 105 and $S_D$ 111. Consequently, there may be two transitional durations during each switching cycle during which both switches are off. These durations are called deadtime in switching converters.

During these deadtimes, $V_{SW}$ transitions up and down and the body diode 109 conducts $I_L$ to the output terminal, as shown in FIG. 1B. To ensure this break-before-make operation, the system senses that one switch is turned off before commanding the other switch to turn on. Additional delays are often inserted in the off-to-on durations to ensure enough deadtime, depending on the type and size of power switches.

Figure 2:
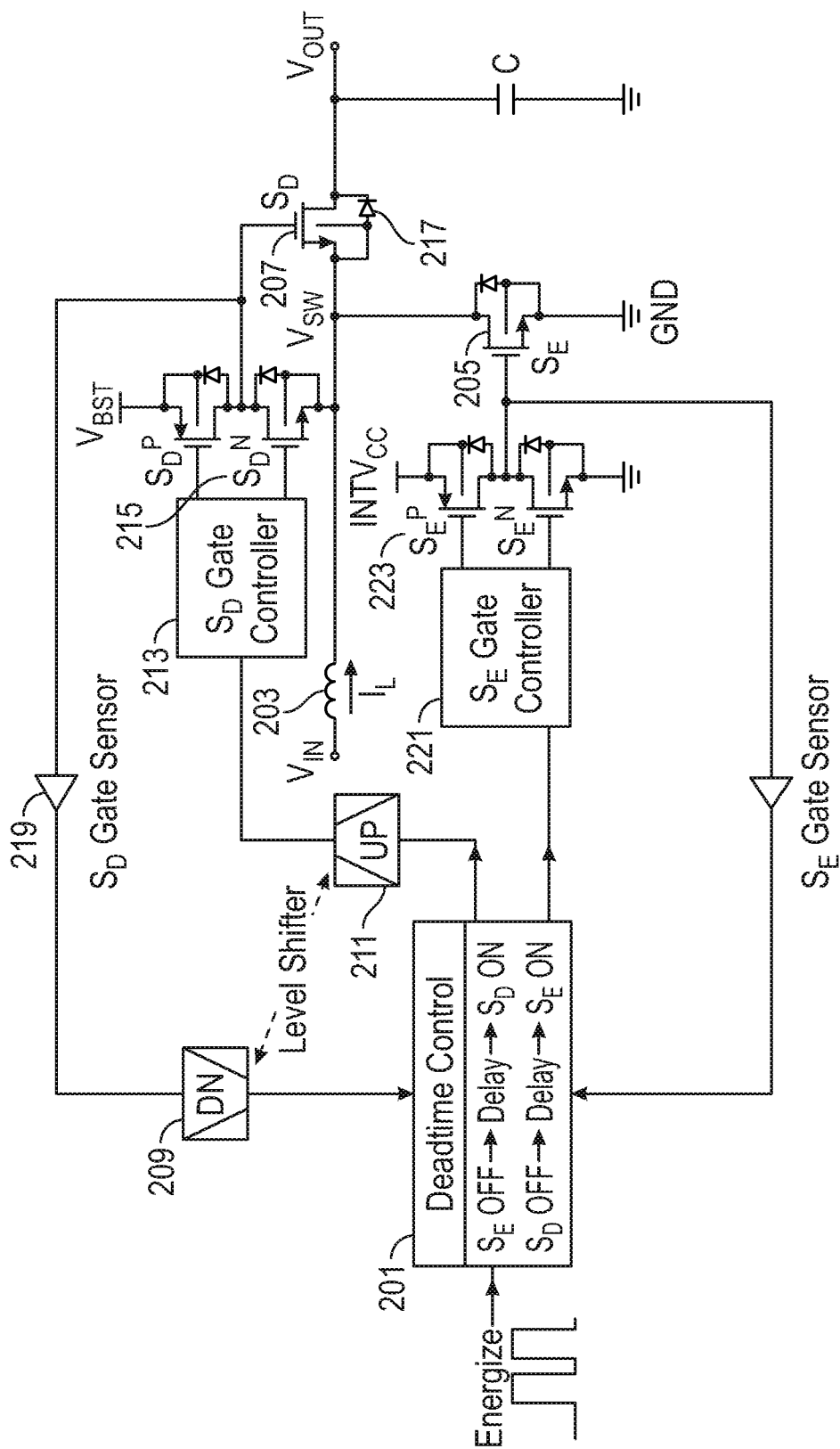
FIG. 2 illustrates an example of a conventional synchronous boost converter with deadtime control.

FIG. 2 illustrates an example of a synchronous boost converter with a deadtime control 201. When an ENERGIZE signal rises high to energize an inductor 203 through an $S_E$ 205, the deadtime control 201 allows the $S_E$ 205 to be on only after an $S_D$ 207 is off and some delay has passed. Similarly, when the ENERGIZE signal falls low to de-energize the inductor 203 through the $S_D$ 207, the deadtime control 201 checks that the $S_E$ 205 is off and allows the $S_D$ 207 to be on after another delay. There may also be UP and DN level shifters 211 and 209, respectively, to communicate between (INTV$_{CC}$-GND) rail and ($V_{BST}$-$V_{SW}$) rail signals, where $V_{BST}$ is a floating supply voltage generated elsewhere in the system.

Conventional switching converters require deadtime to prevent the shoot-through current. But there are associated power losses with the deadtime. When $I_L$ flows through the body diode instead of the switch channel, conduction loss of the body diode may be larger than the counterpart of the enhanced channel resistance. Even greater loss can occur due to the reverse-recovery charge of the body diode. The body diode of the MOSFET stores charge when it is forward-biased to conduct current. The amount of this charge tends to increase with the diode conduction time and the current magnitude in switching converters. To turn off, or to reverse-bias the body diode, the conducted current and the stored charge may be redirected and removed. Toward the end of the de-energizing phase of a boost converter, the $S_D$ 207 is turned off and the body diode conducts $I_L$ to the output terminal. At this point, the $S_E$ 205 is turned on to pull $V_{SW}$ down. The amount of current the $S_E$ 205 utilizes to pull is greater than the magnitude of $I_L$, and the major contributor of the extra current is the reverse-recovery charge of the body diode. During this falling transition of $V_{SW}$, the $S_E$ 205 will experience both high voltage and high current, resulting in a significant switching loss. Furthermore, the increased amount of current that the $S_E$ 205 pulls during this duration substantially increases the ringing and exacerbates the EMI radiation of the system.

One traditional way of establishing the deadtime is to insert a fixed delay between detecting a switch turn-off and commanding the other switch to turn on. However, this approach tends to result in a long body diode conduction time, if the gate driver was designed to cater to a wide range of power switches. A fix is to provide a means of adjusting the deadtime to a user. When the user knows what application to run the switching converter, and therefore the exact power switches are determined, programming the delay to an optimal condition can reduce the body diode conduction time.

Another approach is to implement an intelligent switching converter controller that autonomously detects the operating conditions of the power switches and programs the delay on-the-fly to minimize deadtime. This self-programmable deadtime approach typically senses the gate-to-source voltage and the drain-to-source voltage of a power switch during the switch node transition to adjust the delay in the gate driver.

These approaches can be useful in reducing body diode conduction to some extent, but they usually reserve more than 10 ns of body diode conduction time to ensure that there is no shoot-through. The sensor—whether the user or the system itself—has its own tolerances in thresholds (i.e., the voltage to decide if a switch is on or off). In addition, the variations in the programmable delays may be difficult to minimize over temperature, process, and voltage, especially since the delays are on the order of nanoseconds. Therefore, in practice, the body diode conduction time cannot be too short to ensure a time margin from the shoot-through disaster.

Minimizing body diode conduction while avoiding shoot-through current has been challenging. This is because the two tasks—turning off a switch and turning on the other switch to redirect the body diode current and to remove the stored charge—are performed by different circuits that may not exhibit timing alignments over process, voltage, and temperature variations. In the synchronous boost converter example in FIG. 2, an $S_D$ gate controller 213 on the ($V_{BST}$-$V_{SW}$) rail turns off the de-energizing switch $S_D$ 207. When the last stage's pull down device $S_D^N$ 215 brings the gate-to-source voltage of the $S_D$ 207 below its threshold, a body diode 217 of the $S_D$ 207 will immediately start to conduct some portion of the inductor current $I_L$.

Detecting this exact turn off event may not be a straightforward task. Even if it is accomplished, there are delays from an $S_D$ gate sensor 219, the DN level shifter 209, the deadtime control 201, and an $S_E$ gate controller 221 that can easily cost more than several nanoseconds of body diode conduction time, even before an $S_E^P$ 223 starts pulling up the energizing switch $S_E$ 205's gate voltage to steal $I_L$ from the body diode 217 of the $S_D$ 207. To compensate for these inherent delays, the gate voltage sensing is sometimes started a few stages earlier from the last stage of the driver. This early start can provide the opportunity to align the turn-off of the $S_D$ 207 and the turn-on of the $S_E$ 205, but at the risk of shoot-through current. Because the time earned by the head start and the delays in the DN level-shifter 209 and the driver may not match all the time and will vary within their own tolerances, it may be necessary to turn the $S_E$ 205 on a little slower. As a result, the system can still end up with a noticeable body diode conduction time even in the early start case.

The timing alignment challenge of two different circuits may be eliminated by using a single device to perform the tasks of turning off the de-energizing switch 207 and redirecting its body diode current.

Figure 3:
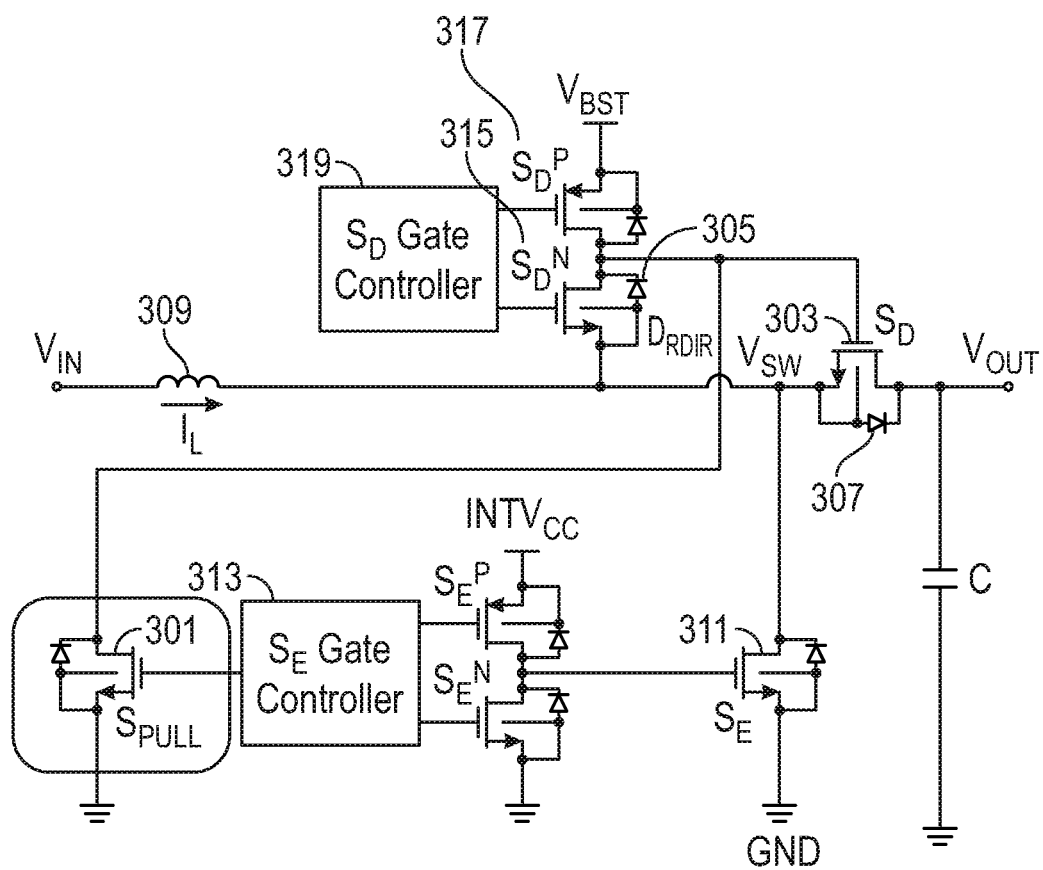
FIG. 3 illustrates an example of a synchronous boost converter power stage with a gate drive that may minimize body diode conduction.

FIG. 3 illustrates an example of a synchronous boost converter power stage with a gate drive that may minimize body diode conduction. A pull-down device $S_{PULL}$ 301 is turned on to shut a $S_D$ 303 off and steal its body diode 307 current through a redirection diode $D_{RDIR}$ 305. When the gate-to-source voltage of the $S_D$ 303 is pulled below its threshold by the current from the $S_{PULL}$ 301, $I_L$ will start flowing through the body diode 307 of the $S_D$ 303. The $S_{PULL}$ 301 will continue pulling the gate voltage below $V_{SW}$ until the $D_{RDIR}$ 305 is forward-biased. The $D_{RDIR}$ 305 clamps the gate voltage of the $S_D$ 303 at about a diode voltage below its source voltage (i.e., $V_{SW}$-0.7V) and protects the gate-oxide of the $S_D$ 303.

The $D_{RDIR}$ 305 allows the $S_{PULL}$ 301 to seamlessly redirect $I_L$ from the body diode 307 of the $S_D$ 303, without any timing alignment requirements to tradeoff between the deadtime reduction and the shoot-through current prevention. The body diode 307 of the $S_D$ 303 conducts in this method like previous approaches, but it can only conduct for a substantially short duration—from the moment the gate-to-source voltage of the $S_D$ 303 crosses its threshold voltage until the $D_{RDIR}$ 305 is forward-biased. Because the magnitude of the $S_{PULL}$ 301's current is designed to be high enough to overcome current in an inductor 309, once the $D_{RDIR}$ 305 conducts current from the switch node (i.e., $V_{SW}$) to the $S_{PULL}$ 301, no current will be left for the body diode 307 of the $S_D$ 303.

Immediately before this forward-biasing of the $D_{RDIR}$ 305, the high current of the $S_{PULL}$ 301 is pulling down the gate of the $S_D$ 303. Therefore, the gate voltage travels quickly from the threshold voltage above $V_{SW}$ to a diode voltage below $V_{SW}$, leaving a substantially short amount of time for body diode conduction. This high current of the $S_{PULL}$ 301 and the seamless transition from turning off the $S_D$ 303 to redirecting the body diode current can result in body diode conduction time of less than a nanosecond. This substantially short body diode conduction time can reduce the amount of reverse-recovery charge and its associated problems in the boost converter.

Conventional approaches may assign an energizing switch such as $S_E$ 311 to change the inductor 309 current direction from the $S_D$ 303. However, the $S_D$ 303 and the $S_E$ 311 can form a short circuit from $V_{OUT}$ to ground if they are turned on at the same time. The proposed technique uses the $S_{PULL}$ 301 to change the inductor 309 current direction from the $S_D$ 303. Unlike previous methods, there is no potential short circuit path from $V_{OUT}$ to ground through the $S_D$ 303 and the $S_{PULL}$ 301. The order of the $S_{PULL}$ 301's operations is aligned to first shut the $S_D$ 303 off and then redirect its current. However, in some implementations, this does not mean that the $S_E$ 311 is not needed. A gate controller 313 for the $S_E$ 311 may still turn the $S_E$ 311 on quickly after it turns on the $S_{PULL}$ 301 to redirect the inductor 309 current so that the $S_E$ 311 performs the role of the main energizing switch, as in other boost converters. The proposed technique relieves the burden on the $S_E$ 311 by employing the $S_{PULL}$ 301 to redirect the current.

The diode $D_{RDIR}$ 305 may be just a body diode of a pull-down NMOS device $S_D^N$ 315 in the last stage of the ($V_{BST}$-$V_{SW}$) rail driver in FIG. 3. The only additional component of this approach that demands extra silicon or printed-circuit-board real estate compared to other approaches may be the pull-down device $S_{PULL}$ 301.

Another detail is the condition of the ($V_{BST}$-$V_{SW}$) rail driver output when the $S_{PULL}$ 301 is pulling down the gate of the $S_D$ 303. Just before the $S_{PULL}$ 301 is in action, the gate voltage is pulled up to $V_{BST}$ by a pull-up PMOS device $S_D^P$ 317 in the last stage of the ($V_{BST}$-$V_{SW}$) rail driver. Therefore, an $S_D$ gate controller 319 for the $S_D$ 303 may prepare appropriately to avoid the conflict between the $S_D^P$ 317 and the $S_{PULL}$ 301. In other words, the $S_D$ gate controller 319 may turn off the $S_D^P$ 317 when the $S_{PULL}$ 301 is pulling the gate of the $S_D$ 303.

Figure 4:
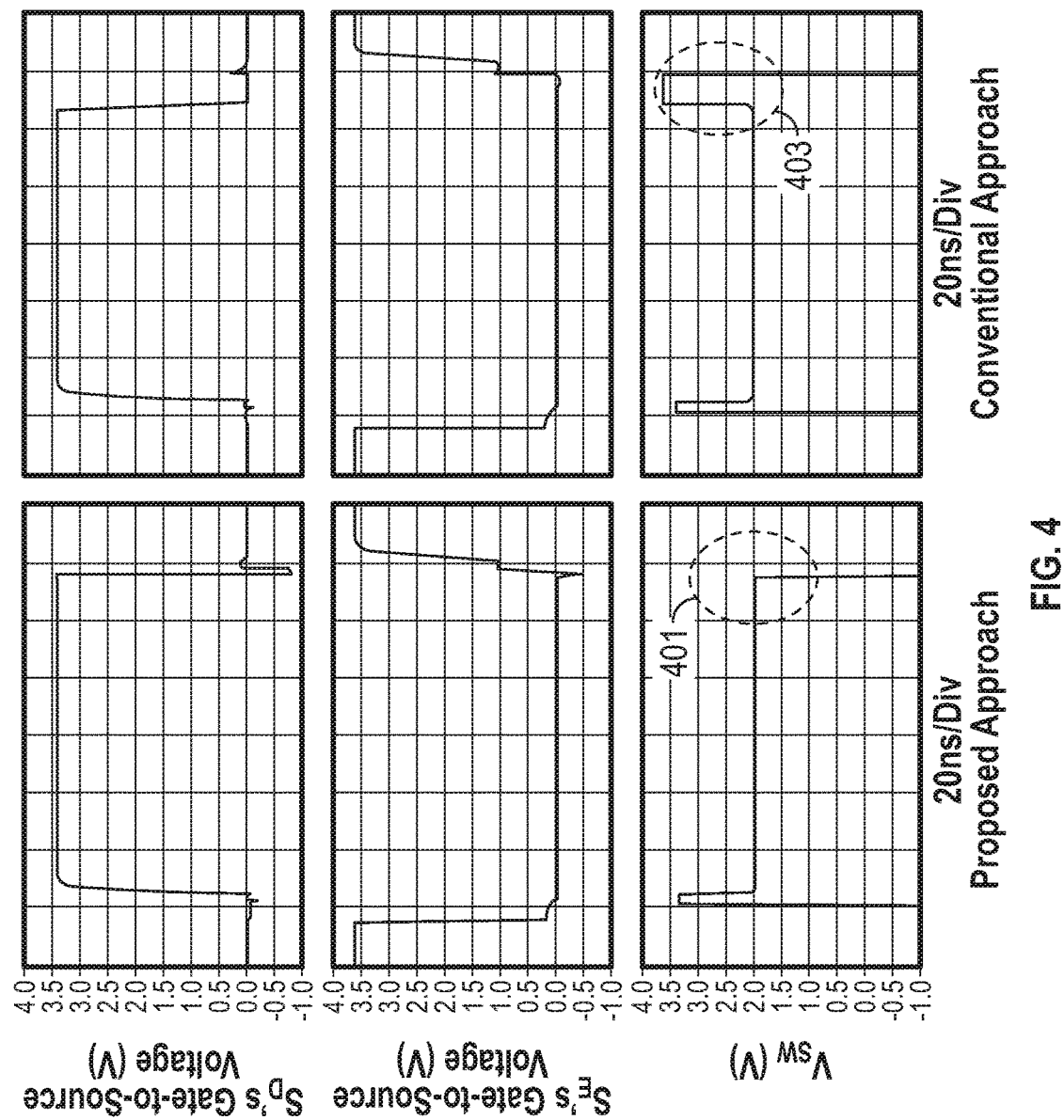
FIG. 4 illustrates examples of operational gate-to-source voltages of power switches $S_D$ and $S_E$ and a voltage at the switch node for a proposed synchronous boost converter power stage (e.g., one that uses a gate drive, such as the one illustrated in FIG. 3) as compared to a conventional boost converter power stage.

FIG. 4 illustrates examples of operational gate-to-source voltages of power switches $S_D$ and $S_E$ and a voltage at the switch node for a proposed synchronous boost converter power stage (e.g., one that uses a gate drive, such as the one illustrated in FIG. 3) as compared to a conventional boost converter stage. A comparison of dotted circles 401 and 403 on the $V_{SW}$ waveforms highlight the minimized (or almost removed) body diode conduction operation of the proposed technique.

The proposed technique may be applied to synchronous boost converters in which the de-energizing switch $S_D$ is an NMOS switch. Hence, this exact technique may not be compatible with buck converters, non-synchronous boost converters, and synchronous boost converters with a PMOS de-energizing switch. On the other hand, this method can be useful for synchronous buck-boost converters and synchronous H-bridge circuits using NMOS power switches where the current flows through the body diode of the high-side de-energizing switches before the low-side energizing switches turn on.

In addition, this technique can be useful if GaN power switches are used in place of the NMOS power switches for synchronous boost, buck-boost, and H-bridge converter circuits, as the voltages of the body diode counterpart for the GaN devices are much higher.

Figure 5:
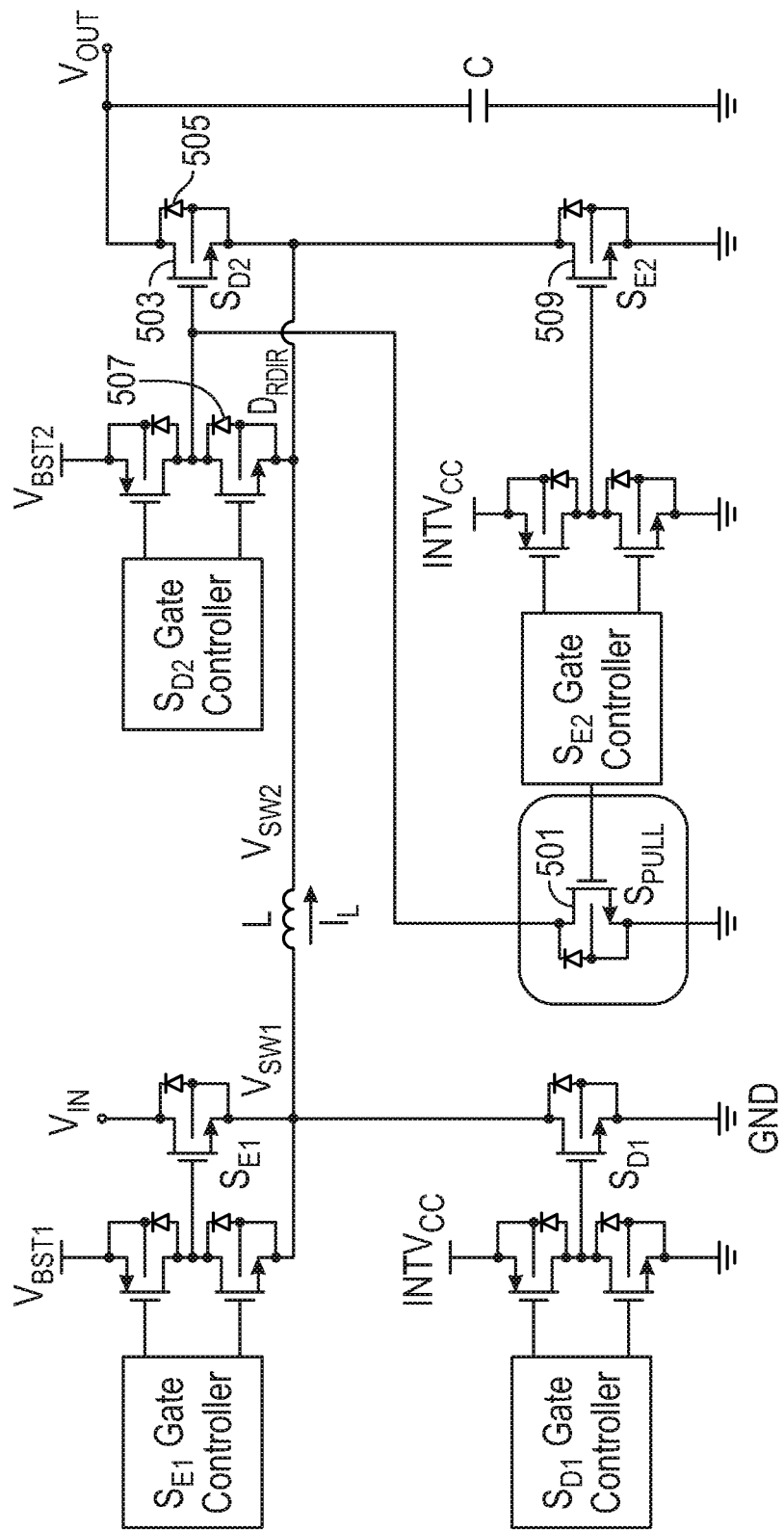
FIG. 5 illustrates an example of a synchronous buck-boost converter power stage with a gate drive that may minimize body diode conduction.

FIG. 5 illustrates an example of a synchronous buck-boost converter power stage with a gate drive that may minimize body diode conduction. The power stage delivers energy from $V_{IN}$ to $V_{OUT}$ by energizing the inductor L through the energizing power switches $S_{E1}$ and $S_{E2}$ 509 and de-energizing the inductor L through the de-energizing power switches $S_{D1}$ and $S_{D2}$ 503. The system first turns on $S_{E1}$ and $S_{E2}$ 509 to energize the inductor. When the inductor current reaches some specific value set by a control circuit not shown in this figure but exists elsewhere in the system, the system turns off $S_{E1}$ and the inductor current will pull the first switching node $V_{SW1}$ down until the body diode of $S_{D1}$ forward-biases. This transition of $V_{SW1}$ voltage is performed by the inductor current in this first deadtime. Then $S_{D1}$ is turned on to reduce the conduction losses in circulating the inductor current through $S_{D1}$ and $S_{E2}$ 509. To de-energize the inductor to the output terminal, the system turns off $S_{E2}$ 509 to let the inductor current charge the second switching node $V_{SW2}$ up until the body diode 505 of $S_{D2}$ 503 forward-biases. This transition of $V_{SW2}$ voltage is also done by the inductor current in this second deadtime. Then the $S_{D2}$ 503 is turned on to reduce the conduction losses in delivering the inductor energy to the output terminal. Now before going back to the energizing phase, the synchronous buck-boost converter goes through another inductor current circulating phase by turning off $S_{D2}$ 503 and turning on $S_{E2}$ 509. The system may put another deadtime for this transition to avoid the shoot-through currents from $V_{OUT}$ to GND through $S_{D2}$ 503 and $S_{E2}$ 509. But when the system turns off $S_D$503, the inductor current flows through the body diode 505 of $S_{D2}$ 503, and the body diode conduction during this third deadtime is the cause of significant power losses and EMI problems.

To reduce this body diode conduction and its associated problems in the synchronous buck-boost converter operation, the proposed gate drive method can use $S_{PULL}$ 501 as in the boost converter counterpart. $S_{PULL}$ 501 is turned on to shut $S_{D2}$ 503 off and steal its body diode 505 current through a redirection diode $D_{RDIR}$ 507. When the gate-to-source voltage of the $S_{D2}$ 503 is pulled below its threshold by the current from $S_{PULL}$ 501, the inductor current will start flowing through the body diode 505 of $S_{D2}$ 503. The $S_{PULL}$ 501 will continue pulling the gate voltage below $V_{SW2}$ until the $D_{RDIR}$ 507 is forward-biased. The $D_{RDIR}$ 507 clamps the gate voltage of the $S_{D2}$ 503 at about a diode voltage below its source voltage (i.e., $V_{SW2}$-0.7V) and protects the gate-oxide of the $S_{D2}$ 503.

The $D_{RDIR}$ 507 allows the $S_{PULL}$ 501 to seamlessly redirect the inductor current from the body diode 505 of the $S_{D2}$ 503, without any timing alignment requirements to tradeoff between the deadtime reduction and the shoot-through current prevention. The body diode 505 of the $S_{D2}$ 503 may conduct in this method like a conventional approach, but only conduct for a substantially short duration—from the moment the gate-to-source voltage of the $S_{D2}$ 503 crosses its threshold voltage until the $D_{RDIR}$ 507 is forward-biased. Because the magnitude of the $S_{PULL}$ 501's current is designed to be high enough to overcome the inductor current, once the $D_{RDIR}$ 507 conducts current from the switch node (i.e., $V_{SW2}$) to the $S_{PULL}$ 501, no current will be left for the body diode 505 of the $S_{D2}$ 503.

Immediately before this forward-biasing of the $D_{RDIR}$ 507, the high current of the $S_{PULL}$ 501 is pulling down the gate of the $S_{D2}$ 503. Therefore, the gate voltage travels quickly from the threshold voltage above $V_{SW2}$ to a diode voltage below $V_{SW2}$, leaving a substantially short amount of time for body diode conduction. This high current of the $S_{PULL}$ 501 and the seamless transition from turning off the $S_{D2}$ 503 to redirecting its body diode current can result in body diode conduction time of less than a nanosecond. This substantially short body diode conduction time can reduce the amount of reverse-recovery charge and its associated problems in the synchronous buck-boost converter.

Figure 6:
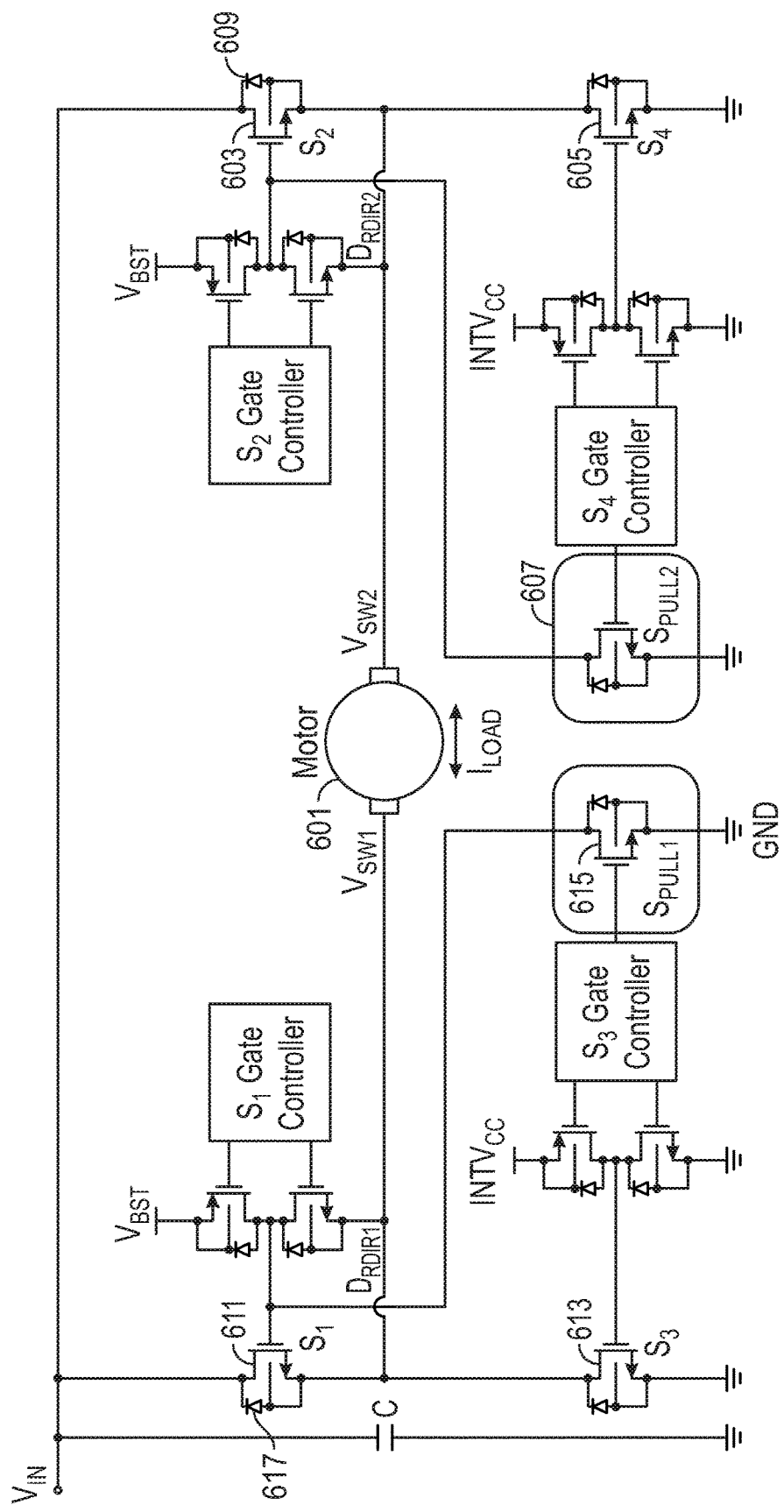
FIG. 6 illustrates an example of a synchronous H-bridge converter power stage that drives a motor with a gate drive that may minimize body diode conduction.

FIG. 6 illustrates an example of a synchronous H-bridge converter power stage that drives a motor 601 with a gate drive that may minimize body diode conduction. Load current $I_{LOAD}$ can be bi-directional, meaning that it can flow from $V_{SW1}$ to $V_{SW2}$ and vice versa. When $I_{LOAD}$ flows from $V_{SW1}$ to $V_{SW2}$ and the system commutate $S_2$ and $S_4$, deadtimes ensure the break-before-make commutations and prevent large shoot-through currents from $V_{IN}$ to GND. Similar to the boost converter case, the problematic deadtime is right after $S_2$ is turned off and before $S_4$ is turned on. During this deadtime, the load current will flow through $S_2$'s body diode 609 that will accumulate charge from forward-biasing. Hence, $S_4$ may pull extra currents than just the load current to pull $V_{SW2}$ node down and induces more power losses and EMI noises during the falling edge of $V_{SW2}$ node than without the reverse-recovery charge of the body diode 609 of $S_2$ 603.

To reduce this body diode conduction and its associated problems in the synchronous H-bridge converter operation, the proposed gate drive method can use $S_{PULL2}$ 607 as in the boost converter counterpart. $S_{PULL2}$ 607 is turned on to shut $S_2$ 603 off and steal its body diode 609 current through a redirection diode $D_{RDIR2}$. When the gate-to-source voltage of the $S_2$ 603 is pulled below its threshold by the current from $S_{PULL2}$ 607, the load current will start flowing through the body diode 609 of $S_2$ 603. The $S_{PULL2}$ 607 will continue pulling the gate voltage below $V_{SW2}$ until the $D_{RDIR2}$ is forward-biased. The $D_{RDIR2}$ clamps the gate voltage of the $S_2$ 603 at about a diode voltage below its source voltage (i.e., $V_{SW2}$-0.7V) and protects the gate-oxide of the $S_2$ 603.

The $D_{RDIR2}$ allows the $S_{PULL2}$ 607 to seamlessly redirect the load current from the body diode 609 of the $S_2$ 603, without any timing alignment requirements to tradeoff between the deadtime reduction and the shoot-through current prevention. The body diode 609 of the $S_2$ 603 may conduct in this method like a conventional approach, but only conduct for a substantially short duration—from the moment the gate-to-source voltage of the $S_2$ 603 crosses its threshold voltage until the $D_{RDIR2}$ is forward-biased. Because the magnitude of the $S_{PULL2}$ 607's current is designed to be high enough to overcome the load current, once the $D_{RDIR2}$ conducts current from the switch node (i.e., $V_{SW2}$) to the $S_{PULL2}$ 607, no current will be left for the body diode 609 of the $S_2$ 603.

Immediately before this forward-biasing of the $D_{RDIR2}$, the high current of the $S_{PULL2}$ 607 is pulling down the gate of the $S_2$ 603. Therefore, the gate voltage travels quickly from the threshold voltage above $V_{SW2}$ to a diode voltage below $V_{SW2}$, leaving a substantially short amount of time for body diode conduction. This high current of the $S_{PULL}$ 607 and the seamless transition from turning off the $S_2$ 603 to redirecting its body diode current can result in body diode conduction time of less than a nanosecond. This short body diode conduction time can reduce the amount of reverse-recovery charge and its associated problems in the synchronous H-bridge converter.

Because of the symmetric architecture of the H-bridge converter, the problem and solution are symmetric for the case when the load current flows from $V_{SW2}$ to $V_{SW1}$. In other words, when $I_{LOAD}$ flows from $V_{SW2}$ to $V_{SW1}$ and the system may turn off an $S_1$ 611 then turn on an $S_3$ 613, an $S_{PULL1}$ 615 can pull down the gate of the $S_1$ 611 to shut off and reduce a body diode 617 conduction of the $S_1$ 611, without any timing alignment issues to avoid the shoot-through problem as in the boost converter case.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A control circuit for a synchronous converter that includes a power source, an inductor, and an output terminal, the control circuit comprising:
    an electronic energizing switch that, when activated, delivers energy from the power source to the inductor;
    an electronic de-energizing switch that, when activated, delivers energy from the inductor to the output terminal, the electronic de-energizing switch including a body diode; and
    an electronic pull-down switch that, when activated, turns off the electronic de-energizing switch, and causes current flowing through the body diode of the electronic de-energizing switch to be redirected to a second diode when the second diode becomes forward biased, and removes charge from the body diode of the electronic de-energizing switch, wherein the electronic energizing switch and the electronic de-energizing switch are never both activated at the same time, wherein the second diode is coupled to the electronic pull-down switch.

2. The control circuit of claim 1 wherein the current and charge from the first body diode are removed by the electronic pull-down switch within no more than one nanosecond.

3. The control circuit of claim 1, wherein the body diode is a first body diode, and wherein the second diode comprises a second body diode of a given electronic switch through which the current redirected from the first body diode and the charge removed from the first body diode flows.

4. The control circuit of claim 1 further comprising a driver that controls the electronic energizing switch and the electronic de-energizing switch, and wherein the second diode is a body diode in the driver.

5. The control circuit of claim 1 wherein the electronic energizing switch, the electronic de-energizing switch, and the electronic pull-down switch are each an NMOS device or a GaN power switch.

6. The control circuit of claim 1, wherein the electronic energizing switch and the electronic de-energizing switch are turned off during an overlapping portion of time, and wherein the synchronous converter is a synchronous boost converter.

7. The control circuit of claim 1 wherein the synchronous converter is a synchronous buck-boost converter or a synchronous H-bridge converter.

8. A method for operating a synchronous converter, the method comprising:
    delivering energy from a power source to an inductor via activation of an electronic energizing switch,
    delivering energy from the inductor to an output terminal of the synchronous converter via activation of an electronic de-energizing switch that includes a body diode; and
    deactivating, via activation of an electronic pull-down switch the electronic de-energizing switch to redirect current flowing through the body diode of the de-energizing switch to a second diode when the second diode becomes forward biased and remove charge from the body diode of the de-energizing switch, wherein the electronic energizing switch and the electronic de-energizing switch are never both activated at the same time, wherein the second diode is coupled to the electronic pull-down switch.

9. The method of claim 8, wherein the current and charge from the body diode are removed by the electronic pull-down switch within no more than one nanosecond.

10. The method of claim 8, wherein the body diode is a first body diode, and wherein the second diode comprises a second body diode of a given electronic switch, further comprising redirecting the current from the first body diode and the charge removed from the first body diode through the second body diode.

11. The method of claim 8 further comprising controlling the electronic energizing switch and the electronic de-energizing switch using a driver that includes a body diode comprising the second diode.

12. The method of claim 8, wherein the electronic energizing switch, the electronic de-energizing switch, and the electronic pull-down switches are each an NMOS device or a GaN power switch.

13. The method of claim 8, wherein the electronic energizing switch and the electronic de-energizing switch are turned off during an overlapping portion of time, and wherein the synchronous converter is a synchronous boost converter.

14. The method of claim 8, wherein the synchronous converter is a synchronous buck-boost converter or a synchronous H-bridge converter.

15. A control circuit for a synchronous converter that includes a power source, an inductor, and an output terminal, the control circuit comprising:
    energizing switch means that, when activated, delivers energy from the power source to the inductor;
    de-energizing switch means that, when activated, delivers energy from the inductor to the output terminal, the de-energizing switch means including a body diode; and
    pull-down switch means that, when activated, turns off the de-energizing switch means, and causes current flowing through the body diode of the de-energizing switch means, to be redirected to a second diode when the second diode becomes forward biased, and removes charge from the body diode of the de-energizing switch means, wherein the energizing switch means and the de-energizing switch means are never both activated at the same time, wherein the second diode is coupled to the electronic pull-down switch.

16. The control circuit of claim 15 wherein the current and charge from the body diode are removed by the pull-down switch means within no more than one nanosecond.

17. The control circuit of claim 15, wherein the body diode is a first body diode, and wherein the second diode comprises a second body diode of a given electronic switch means through which the current redirected from the first body diode and the charge removed from the first body diode flows.

18. The control circuit of claim 15 further comprising driver means that control the energizing switch means and the de-energizing switch means, and wherein the second diode is a body diode in the driver means.

19. The control circuit of claim 15, wherein the electronic energizing switch and the electronic de-energizing switch are turned off during an overlapping portion of time. and, wherein the synchronous converter is a synchronous boost converter.

20. The control circuit of claim 15 wherein the synchronous converter is a synchronous buck-boost converter, or a synchronous H-bridge converter.

\* \* \* \* \*